US012770426B2

(12) United States Patent

Strohmann et al.

(10) Patent No.: US 12,770,426 B2

(45) Date of Patent: Oct. 20, 2026

(54) TRANSPARENT FINGERPRINT SENSOR

(71) Applicant: QUALCOMM Incorporated, San Diego, CA (US)

(72) Inventors: Jessica Liu Strohmann, Cupertino, CA (US); Sumit Agrawal, Sunnyvale, CA (US); Jae Hyeong Seo, Pleasanton, CA (US); Kostadin Dimitrov Djordjev, Los Gatos, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 18/787,910

(22) Filed: Jul. 29, 2024

(65) Prior Publication Data

US 2026/0030913 A1 Jan. 29, 2026

(51) Int. Cl.

*G06V 40/13* (2022.01)
*B06B 1/06* (2006.01)
*G06V 40/12* (2022.01)

(52) U.S. Cl.

CPC ........ *G06V 40/1306* (2022.01); *B06B 1/0688* (2013.01); *G06V 40/1353* (2022.01)

(58) Field of Classification Search

CPC ............ G01S 15/8913; G01S 7/52079; G01S 15/8925; H10K 59/00; H10K 59/65; H10K 59/8722; H10K 59/8792; H10K 77/111; H10K 2102/311; G06F 3/043; G06F 3/0433; G06F 3/0436; G06V 40/1306; G06V 40/1353; B06B 1/0688

See application file for complete search history.

(56) References Cited

U.S. PATENT DOCUMENTS

| | | | | |
|---|---|---|---|---|
| 2014/0355376 | A1 | 12/2014 | Schneider et al. | |
| 2018/0309043 | A1 | 10/2018 | Kobrin et al. | |
| 2018/0373913 | A1* | 12/2018 | Panchawagh .......... | H10K 59/00 |
| 2019/0042035 | A1 | 2/2019 | Kim | |
| 2020/0282424 | A1 | 9/2020 | Oralkan et al. | |

(Continued)

FOREIGN PATENT DOCUMENTS

| | | | | |
|---|---|---|---|---|
| CN | 111613638 A * | 9/2020 | ......... | G06V 40/1318 |
| CN | 214846677 U | 11/2021 | | |

(Continued)

OTHER PUBLICATIONS

Stobing C., "CES 2024: With Transparent Displays From Samsung, LG, Are We Finally in the Future?", PCmag, Jan. 9, 2024, 12 pages.

(Continued)

*Primary Examiner* — Abhishek Sarma

(74) *Attorney, Agent, or Firm* — QUALCOMM Incorporated

(57) ABSTRACT

An apparatus may include a transparent display stack and a transparent fingerprint sensor stack. The transparent fingerprint sensor stack may include transparent fingerprint sensor circuitry, transparent fingerprint sensor electrodes, a transparent piezoelectric layer and a transparent adhesive layer proximate the transparent display stack. In some examples, at least some layers of the transparent fingerprint sensor stack may be, or may include, an acoustic resonator configured to produce a local maximum of ultrasonic wave transmission at a frequency in a range from 1 MHz to 20 MHz.

19 Claims, 7 Drawing Sheets

(56) References Cited

U.S. PATENT DOCUMENTS

| | | | |
|---|---|---|---|
| 2023/0086418 A1 | 3/2023 | Strohmann et al. |
| 2024/0005693 A1 | 1/2024 | Khuri-Yakub et al. |
| 2024/0423480 A1 | 12/2024 | Agrawal et al. |

FOREIGN PATENT DOCUMENTS

| | | |
|---|---|---|
| KR | 20190139027 A | 12/2019 |
| WO | 2023034657 | 3/2023 |

OTHER PUBLICATIONS

International Search Report and Written Opinion—PCT/US2025/036327—ISA/EPO—Oct. 14, 2025.

Zhang X., "Capacitive Micromachined Ultrasonic Transducers (CMUTs) on Glass Substrates for Next-Generation Medical Imaging and Beyond", Arxiv.Org, Cornell University Library, 201 Olin Library Cornell University Ithaca, NY 14853, Oct. 19, 2018, 176 Pages, XP081418121, chapter 6; p. 104-p. 129.

* cited by examiner

TRANSPARENT FINGERPRINT SENSOR

TECHNICAL FIELD

This disclosure relates generally to fingerprint sensors and to related methods, devices and systems.

DESCRIPTION OF THE RELATED TECHNOLOGY

Biometric authentication can be an important feature for controlling access to devices, etc. Many existing products include fingerprint sensors for biometric authentication. Although existing fingerprint sensors provide benefits, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a transparent display stack and a transparent fingerprint sensor stack. The transparent fingerprint sensor stack may include transparent fingerprint sensor circuitry, transparent fingerprint sensor electrodes, a transparent piezoelectric layer and a transparent adhesive layer proximate the transparent display stack. At least some layers of the transparent fingerprint sensor stack may be parts of an acoustic resonator configured to produce a local maximum of ultrasonic wave transmission at a frequency in a range from 1 MHz to 20 MHz.

According to some examples, the apparatus may be a transparent apparatus configured to allow visible light to pass from outside of a first side of the apparatus proximate the transparent display stack, through the transparent display stack and the transparent fingerprint sensor stack, to outside of a second side of the apparatus proximate the transparent fingerprint sensor stack.

In some examples, the apparatus may include an ultraviolet light blocking layer configured to block most or all ultraviolet light from reaching at least a portion of the transparent fingerprint sensor circuitry. According to some examples, the transparent adhesive layer may be one boundary of the acoustic resonator.

According to some examples, the transparent fingerprint sensor stack also may include a high-impedance layer adjacent to the transparent adhesive layer. In some such examples, the high-impedance layer may be one boundary of the acoustic resonator. In some such examples, the high-impedance layer may have a high-impedance layer acoustic impedance that is higher than a transparent fingerprint sensor circuitry acoustic impedance, higher than a transparent fingerprint sensor electrode acoustic impedance and higher than a transparent piezoelectric layer acoustic impedance.

In some examples, the transparent display stack may be, or may include, a transparent light-emitting diode (LED) stack. In some such examples, the transparent LED stack may be, or may include, a transparent microLED stack or a transparent organic LED (OLED) stack.

According to some examples, the transparent fingerprint sensor circuitry may include a glass-based or polyimide-based thin-film transistor (TFT) layer. In some examples, the transparent fingerprint sensor electrodes may be, or may include, indium tin oxide (ITO), graphene-based electrodes, silver nanowires, carbon nanotubes, one or more conductive polymers, aluminum-doped zinc oxide (AZO), fluorine-doped tin oxide (FTO), or combinations thereof. According to some examples, the transparent piezoelectric layer may be, or may include, one or more piezoelectric copolymers, PVDF, lead magnesium niobate/lead titanate (PMN-PT), lithium niobate ($LiNbO_3$), or combinations thereof. In some examples, the transparent adhesive layer may be, or may include, ultraviolet (UV) adhesive, a clear epoxy resin, clear double-side tape, silicone adhesive, cyanoacrylate, or combinations thereof.

In some examples, the apparatus may be, or may include, augmented reality (AR) glasses, an AR or a virtual reality (VR) headset, a motorcycle visor, a television or other display device, a laptop computer, or a windscreen or other vehicle component.

According to some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the control system may be configured to do the following: control the transparent fingerprint sensor stack to transmit ultrasonic waves to a target object on an outer surface of the apparatus; receive, from the transparent fingerprint sensor stack, fingerprint sensor signals corresponding to reflected ultrasonic waves from the target object; and perform an authentication process based, at least in part, on the fingerprint sensor signals. In some examples, the transparent display stack may reside between the transparent fingerprint sensor stack and the outer surface of the apparatus that the target object is on.

Other innovative aspects of the subject matter described in this disclosure may be implemented via one or more methods. Some methods may involve controlling a transparent fingerprint sensor stack to transmit ultrasonic waves through a transparent display to a target object on an outer surface of an apparatus proximate the transparent display. Some methods may involve receiving, from the transparent fingerprint sensor stack, fingerprint sensor signals corresponding to reflected ultrasonic waves from the target object. Some methods may involve performing an authentication process based, at least in part, on the fingerprint sensor signals.

In some examples, at least some layers of the transparent fingerprint sensor stack may be part of an acoustic resonator configured to produce a local maximum of ultrasonic wave transmission at a frequency in a range from 1 MHz to 20 MHz. According to some examples, the authentication process may involve extracting fingerprint minutiae from the fingerprint sensor signals and comparing the fingerprint minutiae to previously-obtained fingerprint minutiae.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform one or more methods. Some methods may involve controlling a transparent fingerprint sensor stack to transmit ultrasonic waves through a transparent display to a target object on an outer surface of an apparatus proximate the transparent display. Some methods may involve receiving, from the transparent fingerprint sensor stack, fingerprint sensor signals corresponding to reflected ultrasonic waves from the target object. Some methods may involve performing an authentication process based, at least in part, on the fingerprint sensor signals.

In some examples, at least some layers of the transparent fingerprint sensor stack may be part of an acoustic resonator configured to produce a local maximum of ultrasonic wave transmission at a frequency in a range from 1 MHz to 20 MHz. According to some examples, the authentication process may involve extracting fingerprint minutiae from the fingerprint sensor signals and comparing the fingerprint minutiae to previously-obtained fingerprint minutiae.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
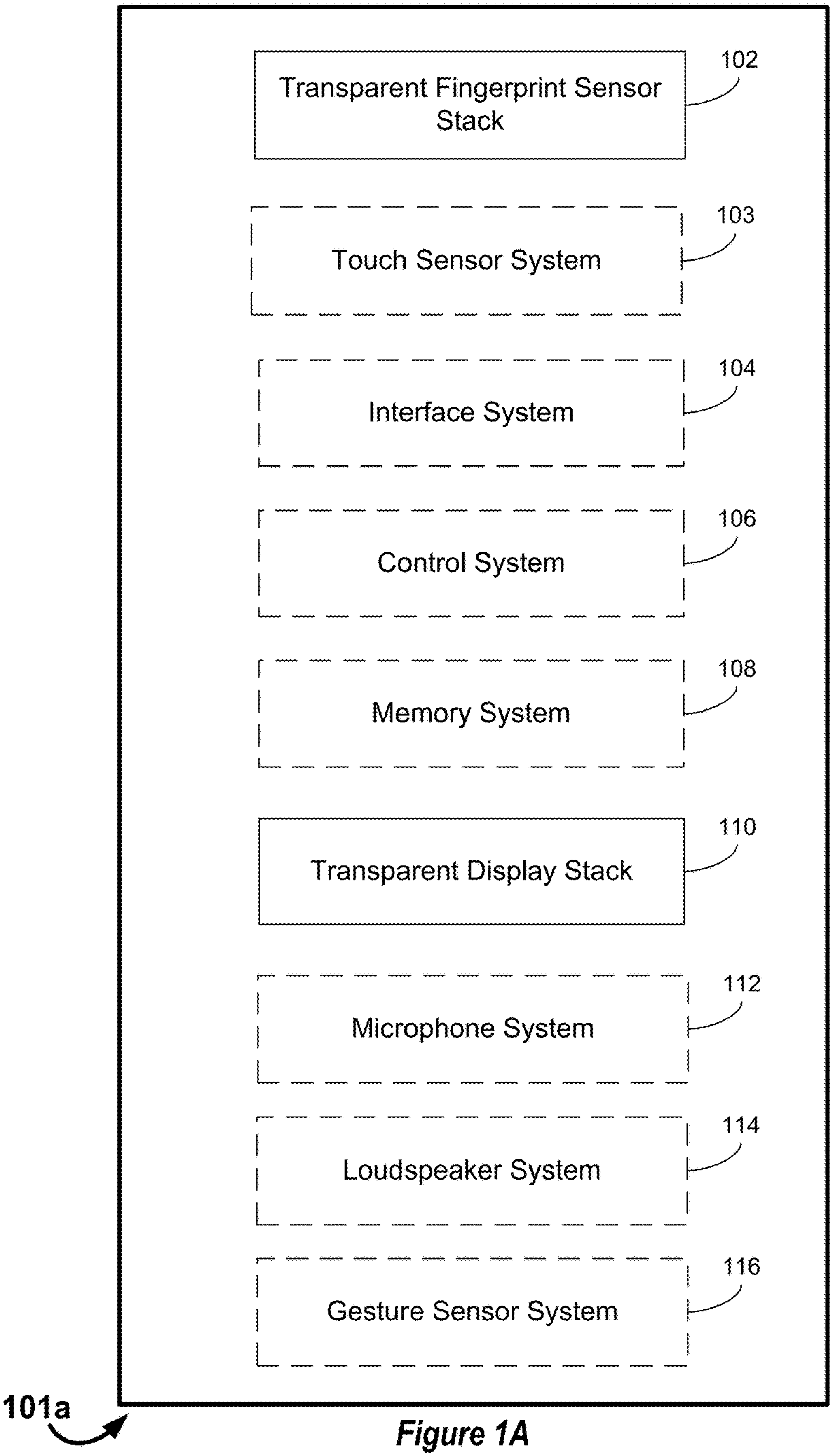
FIG. 1A is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, augmented reality (AR) glasses, AR or virtual reality (VR) headsets, motorcycle visors, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, vehicle displays (including odometer and speedometer displays, etc.), vehicle windscreens or other vehicle components, cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Transparent display devices, such as transparent television displays, have recently been presented. As used herein, "transparency" refers to optical transparency in the humanly-visible spectral range. Accordingly, a "transparent" material is optically transparent in the humanly-visible spectral range. As described herein, a "transparent display device" is one through which light in the visible spectrum may pass through from one side to another, such that a person viewing images on the transparent display device may also see through the transparent display device and view whatever is on the other side, such as a wall, furniture, a pet, a person, etc.

It can be advantageous to provide a fingerprint sensor that may be used in connection with (e.g., attached to) a display. In some such examples, such as in many currently-deployed cell phones, a display stack may reside between a fingerprint sensor stack and the outer surface of the device that is touched by a finger during an authentication process. (As used herein, the word "finger" may correspond to any digit, including a thumb. Accordingly, a thumbprint is a type of fingerprint.) However, previously-deployed fingerprint sensors were not transparent and therefore were not suitable for use with a transparent display device.

Some disclosed devices may include a transparent fingerprint sensor stack. The transparent fingerprint sensor stack may include transparent fingerprint sensor circuitry, transparent fingerprint sensor electrodes and a transparent piezoelectric layer. In some implementations, an apparatus also may include a transparent display stack. The apparatus may include a transparent adhesive layer between the transparent display stack and the transparent fingerprint sensor stack. According to some examples, at least some layers of the transparent fingerprint sensor stack may be, or may include, an acoustic resonator configured to produce a local maximum of ultrasonic wave transmission at a frequency in a range from 1 MHz to 20 MHz.

Particular implementations of the subject matter described in this disclosure may be implemented to realize one or more of the following potential advantages. Some or all of the disclosed transparent fingerprint sensor stacks are suitable for use with transparent display devices. For example, the transparent fingerprint sensor stacks may be configured to avoid creating visible artifacts or otherwise detract from the visual effects provided by the optical transparency of the transparent display device. In addition, some disclosed devices include an acoustic resonator that is configured to produce a local maximum of ultrasonic wave transmission at a frequency in a range from 1 MHz to 20 MHz, thereby enhancing the power of ultrasonic waves transmitted by the transparent fingerprint sensor stack. Transparent ultrasonic fingerprint sensors have potential advantages over other types of under-display fingerprint sensors, such as under-display optical fingerprint sensors. One reason is that the light transmitted through the display by an optical fingerprint sensor changes the background light levels. Therefore, background light cancellation is difficult for devices that include under-display optical fingerprint sensors. In addition, silicon-based optical sensors are not transparent.

Some disclosed fingerprint sensor stacks may be flexible. This flexibility can provide additional advantages, such as suitability for use with non-planar surfaces, including but not limited to non-planar display surfaces.

FIG. 1A is a block diagram that shows example components of an apparatus according to some disclosed implementations. According to this example, optional elements are shown with a dashed outline. In this example, the apparatus 101*a* includes a transparent fingerprint sensor stack 102 and a transparent display stack 110. Some implementations may include a touch sensor system 103, an interface system 104, a control system 106, a memory system 108, a microphone system 112, a loudspeaker system 114, a gesture sensor system 116, or combinations thereof.

As with other disclosed examples, the types, numbers and arrangements of elements that are shown in FIG. 1A are merely presented by way of example. Other examples may include different types of elements, numbers of elements, arrangements of elements, or combinations thereof. For example, some alternative implementations may not include a transparent display stack 110. Some such implementations may not include any type of display system. Although not shown in FIG. 1A, the apparatus 101*a* may include other components, such as a cover (which may be, or may include, a cover glass), one or more adhesive layers, one or more electrode layers, etc. Some examples are described below.

According to some examples, the transparent fingerprint sensor stack 102 may be, or may include, layers of a transparent ultrasonic fingerprint sensor. Various examples are disclosed herein. Alternatively, or additionally, in some implementations the transparent fingerprint sensor stack 102 may be, or may include, another type of fingerprint sensor, such as an optical fingerprint sensor, a capacitive fingerprint sensor, etc.

However, transparent ultrasonic fingerprint sensors have potential advantages over, for example, optical fingerprint sensors. Background light cancellation is difficult for under-display optical fingerprint sensors: the light transmitted through the display by the optical fingerprint sensor changes the background light levels. In addition, silicon-based optical sensors are not transparent.

In some examples, the transparent fingerprint sensor stack 102 may include an ultrasonic receiver array and a separate ultrasonic transmitter, or transmitter array. In some such examples, the ultrasonic transmitter may include an ultrasonic plane-wave generator. However, various examples of ultrasonic sensors are disclosed herein, some of which may include a separate ultrasonic transmitter and some of which may not. For example, in some implementations, the transparent fingerprint sensor stack 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The transparent fingerprint sensor stack 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the transparent fingerprint sensor stack 102, or from a fingerprint sensor system that includes the transparent fingerprint sensor stack 102, may sometimes be referred to herein as "fingerprint sensor data," "fingerprint sensor signals," "fingerprint image data," etc., whether or not the received data corresponds to an actual digit or another object from which the transparent fingerprint sensor stack 102 has received data. Such data will generally be received from the fingerprint sensor system in the form of electrical signals. Accordingly, without additional processing such image data would not necessarily be perceivable by a human being as an image. As used herein, the word "finger" may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of the transparent display stack 110.

In some examples, the interface system 104 may include a wireless interface system. In some implementations, the interface system 104 may include a user interface system, one or more network interfaces, one or more interfaces between the control system 106 and the transparent fingerprint sensor stack 102, one or more interfaces between the control system 106 and the touch sensor system 103, one or more interfaces between the control system 106 and the memory system 108, one or more interfaces between the control system 106 and the transparent display stack 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101*a*. In some such examples, the interface system 104 may be configured to provide communication between the control system 106 and the transparent fingerprint sensor stack 102. According to some such examples, the interface system 104 may couple at least a portion of the control system 106 to the transparent fingerprint sensor stack 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101*a* and other devices and/or human beings. In some such examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the transparent fingerprint sensor stack 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a transparent display stack 110, the control system 106 may be configured for communication with, and for controlling, the transparent display stack 110. In implementations wherein the apparatus includes a microphone system 112, the control system 106 may be configured for communication with, and for controlling, the microphone system 112. In implementations wherein the apparatus includes a loudspeaker system 114, the control system 106 may be configured for communication with, and for controlling, the loudspeaker system 114. According to some examples, the control system 106 may include one or more dedicated components that are configured for controlling the transparent fingerprint sensor stack 102, the touch sensor system 103, the memory system 108, the transparent display stack 110, the microphone system 112 and/or the loudspeaker system 114.

Some examples of the apparatus 101*a* may include dedicated components that are configured for controlling at least a portion of the transparent fingerprint sensor stack 102 (and/or for processing data received from the transparent fingerprint sensor stack 102). Although the control system 106 and the transparent fingerprint sensor stack 102 are shown as separate components in FIG. 1A, in some implementations at least a portion of the control system 106 and at least a portion of the transparent fingerprint sensor stack 102 may be co-located. For example, in some implementations one or more components of the transparent fingerprint sensor stack 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

According to some examples, the control system 106 may be configured to control the transparent fingerprint sensor stack 102 to transmit ultrasonic waves to a target object on an outer surface of the apparatus 101*a*. In some examples, the control system 106 may be configured to receive, from the transparent fingerprint sensor stack 102, fingerprint sensor signals corresponding to reflected ultrasonic waves from the target object. According to some examples, the control system 106 may be configured to perform an authentication process based, at least in part, on the fingerprint sensor signals. The authentication process may involve extracting fingerprint minutiae from the fingerprint sensor signals and comparing the fingerprint minutiae to previously-obtained fingerprint minutiae, such as fingerprint minutiae obtained during an enrollment process.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In this example, the apparatus 101*a* includes a transparent display stack 110. In some examples, the transparent display stack 110 may be, or may include, a transparent light-emitting diode (LED) stack, such as a transparent microLED stack, a transparent organic LED (OLED) stack, or combinations thereof.

In some implementations, the apparatus 101*a* may include a microphone system 112. The microphone system 112 may include one or more microphones, one or more types of microphones, or combinations thereof.

According to some implementations, the apparatus 101*a* may include a loudspeaker system 114. The loudspeaker system 114 may include one or more loudspeakers, one or more types of loudspeakers, or combinations thereof.

In some implementations, the apparatus 101*a* may include a gesture sensor system 116. The gesture sensor system 116 may be, or may include, an ultrasonic gesture sensor system, an optical gesture sensor system or any other suitable type of gesture sensor system.

Figure 1B:
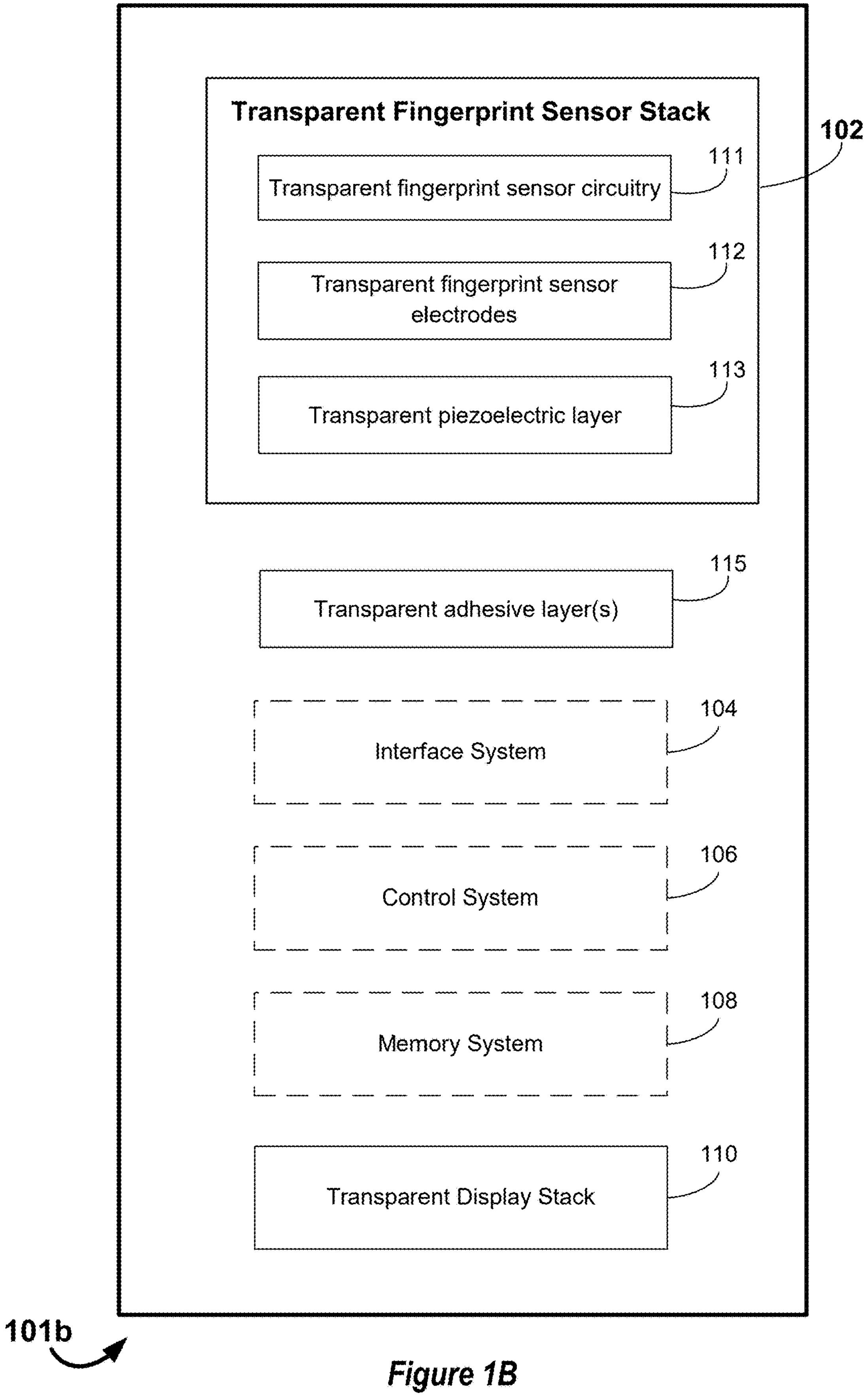
FIG. 1B is a block diagram that shows additional examples of apparatus components according to some disclosed implementations.

FIG. 1B is a block diagram that shows additional examples of apparatus components according to some disclosed implementations. As with other disclosed implementations, the numbers, types and arrangements of elements shown in FIG. 1B are merely presented by way of example. In this example, the apparatus 101*b* is an instance of the apparatus 101*a* that is shown in FIG. 1A. Accordingly, the transparent fingerprint sensor stack 102, interface system 104, control system 106, memory system 108 and transparent display stack 110 shown in FIG. 1B are instances of the transparent fingerprint sensor stack 102, interface system 104, control system 106, memory system 108 and transparent display stack 110 of FIG. 1A. In this example, the apparatus 101*b* is a transparent apparatus that is configured to allow visible light to pass from outside of a first side of the apparatus 101*b* proximate the transparent display stack 110, through the transparent display stack 110 and the transparent fingerprint sensor stack 102, to the outside of a second side of the apparatus proximate the transparent fingerprint sensor stack 102.

According to this example, the transparent fingerprint sensor stack 102 includes transparent fingerprint sensor circuitry 111, transparent fingerprint sensor electrodes 112 and a transparent piezoelectric layer 113. The transparent fingerprint sensor circuitry 111 may include a glass-based thin-film transistor (TFT) layer or a polyimide-based TFT layer. In some examples, the transparent fingerprint sensor circuitry 111 may include indium gallium zinc oxide (IGZO). One potential downside of transparent fingerprint sensor circuitry is that such circuitry may be susceptible to degradation due to exposure by ultraviolet light. Therefore, some implementations of the apparatus 101*b* may include one or more ultraviolet light blocking layers configured to block most or all ultraviolet light from reaching at least a portion of the transparent fingerprint sensor circuitry. According to some examples, the one or more ultraviolet light blocking layers may be configured to block most or all ultraviolet light, but are transparent to light that is visible to humans. For example, polycarbonate and Plexiglas® are both configured to block most ultraviolet (UV) light, but are transparent to light that is visible to humans. The spectrum of light visible to humans is approximately 400 to 700 nanometers (nm), though some sources indicate the range could be as wide as from 380 to 780 nm for some individuals. The UV spectrum for UV light is reported to be in the range of 300 to 400 nm. It has been reported that some polycarbonate shields used in eyewear provide nearly 100% UV protection up to 360 nm and block approximately 96% of UV light up to 380 nm. In some examples, the one or more ultraviolet light blocking layers may form a cover layer on the transparent display stack 110. In some instances, at least a portion of the transparent fingerprint sensor circuitry 111, at least a portion of the control system 106, or both, may reside beneath a bezel or other such light-blocking portion of the apparatus 101*b*.

According to some examples, the transparent fingerprint sensor electrodes 112 may be, or may include, indium tin oxide (ITO), graphene-based electrodes, silver nanowires, carbon nanotubes, one or more conductive polymers, aluminum-doped zinc oxide (AZO), fluorine-doped tin oxide (FTO), or combinations thereof.

In some examples, the transparent piezoelectric layer 113 may be, or may include, one or more transparent piezoelectric copolymers, PVDF, lead magnesium niobate/lead titanate (PMN-PT), lithium niobate ($LiNbO_3$), or combinations thereof. According to some examples, the transparent piezoelectric layer 113 may be configured to function as both an ultrasonic transmitter and an ultrasonic receiver. According to some implementations, the transparent piezoelectric layer 113 may be a single piezoelectric layer, whereas in other implementations the transparent piezoelectric layer 113 may be a multilayer piezoelectric structure, or an array of such structures.

According to this example, the apparatus 101*b* includes one or more transparent adhesive layers 115. In some examples, at least one adhesive layer 115 resides between the transparent fingerprint sensor stack 102 and the transparent display stack 110. According to some such examples, the adhesive layer(s) 115 may be, or may include, ultraviolet (UV) adhesive, clear epoxy resin, clear double-sided tape, silicone adhesive, cyanoacrylate, or combinations thereof.

In some examples, an adhesive layer 115 that resides between the transparent fingerprint sensor stack 102 and the transparent display stack 110 may form one boundary of an acoustic resonator that includes one or more layers of the transparent fingerprint sensor stack 102. In some such examples, the acoustic resonator is configured to produce a local maximum of ultrasonic wave transmission at a frequency in the range from 1 MHz to 20 MHz.

Although not shown in FIG. 1B, in some examples the apparatus 101*b* also includes a high-impedance layer adjacent to one of the transparent adhesive layers 115. The high-impedance layer may, for example, have an acoustic impedance that is higher than an acoustic impedance of the transparent fingerprint sensor circuitry 111, higher than an acoustic impedance of the transparent fingerprint sensor electrodes 112 and higher than an acoustic impedance of the transparent piezoelectric layer 113. In some examples, the high-impedance layer may have an acoustic impedance of 10 MRayls or more. The high-impedance layer may, in some examples, form one boundary of an acoustic resonator that is configured to produce a local maximum of ultrasonic wave transmission at a frequency in the range from 1 MHz to 20 MHz.

The apparatus 101*a* or 101*b* may be used in a variety of different contexts, some examples of which are disclosed herein. For example, in some implementations a mobile device, a television or other display device, a laptop computer, a windscreen or another vehicle component may include at least a portion of the apparatus 101*a* or 101*b*. In some implementations, a wearable device may include at least a portion of the apparatus 101*a* or 101*b*. The wearable device may, for example, be augmented reality (AR) glasses, an AR or a virtual reality (VR) headset, a motorcycle visor, a bracelet, an armband, a wristband, a ring, a headband, a belt or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
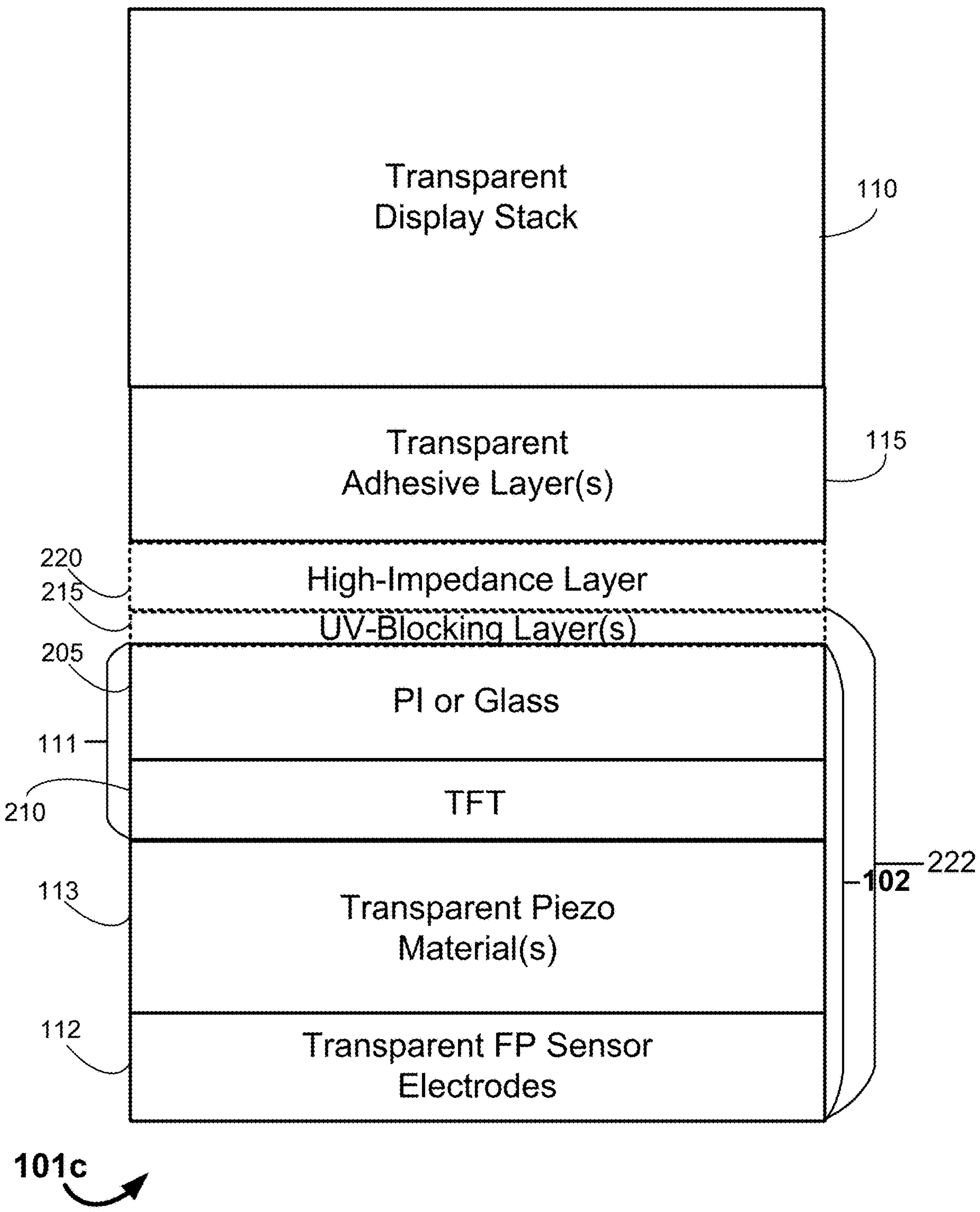
FIG. 2 shows additional examples of a transparent display stack and a transparent ultrasonic sensor stack.

FIG. 2 shows additional examples of a transparent display stack and a transparent ultrasonic sensor stack. As with other disclosed implementations, the types, number and arrangement of elements shown in FIG. 2 are merely examples. Other implementations may include different types, numbers and/or arrangements of elements. Here, the apparatus 101*c* is an instance of the apparatus 101*a* that is shown in FIG. 1A and an instance of the apparatus 101*b* that is shown in FIG. 1B. In this example, the transparent fingerprint sensor stack 102 is attached to the transparent display stack 110 via one or more transparent adhesive layers 115.

According to this example, the transparent fingerprint sensor stack 102 includes transparent fingerprint sensor circuitry 111, transparent fingerprint sensor electrodes 112 and a transparent piezoelectric layer 113. In this example, the transparent fingerprint sensor circuitry 111 includes a transparent substrate layer 205—which may be a flexible layer, such as a IGZO based polyimide (PI) layer or a non-flexible layer such as glass—and a TFT layer 210, which may be a TFT layer 210 such as an glass-based oxidized TFT. In implementations in which the transparent fingerprint sensor circuitry 111 includes a flexible PI layer instead of a rigid layer, such as a glass layer, the entire transparent fingerprint sensor stack 102 may be flexible. Therefore, the transparent fingerprint sensor stack 102 may be conformable to non-planar surfaces, such as doorknobs, door handles, motorcycle helmet visors, vehicle windshields, etc. As noted elsewhere herein, in some examples the transparent fingerprint sensor stack 102—particularly flexible implementations of the transparent fingerprint sensor stack 102—may be deployed without a display system.

As mentioned elsewhere herein, transparent fingerprint sensor circuitry may be susceptible to degradation due to exposure by ultraviolet light. Therefore, in this implementation, the apparatus 101*c* includes one or more ultraviolet light blocking layers 215 that are configured to block most or all ultraviolet light from reaching at least a portion of the transparent fingerprint sensor circuitry 111.

According to some examples, the transparent fingerprint sensor electrodes 112 may be, or may include, indium tin oxide (ITO), graphene-based electrodes, silver nanowires, carbon nanotubes, one or more conductive polymers, aluminum-doped zinc oxide (AZO), fluorine-doped tin oxide (FTO), or combinations thereof.

In this example, the apparatus 101*c* includes one or more transparent piezoelectric materials 113, which is an instance of the transparent piezoelectric layer 113. In some examples, the transparent piezoelectric material(s) 113 may be, or may include, PVDF, one or more transparent piezoelectric copolymers, PMN-PT, $LiNbO_3$, or combinations thereof. According to some implementations, the transparent piezoelectric layer 113 may be a single piezoelectric layer, whereas in other implementations the transparent piezoelectric material(s) 113 may be a multilayer piezoelectric structure, or an array of such structures.

According to this example, the apparatus 101*c* includes one or more transparent adhesive layers 115 residing between the transparent fingerprint sensor stack 102 and the transparent display stack 110. In some examples, the adhesive layer(s) 115 may be, or may include, ultraviolet (UV) adhesive, clear epoxy resin, clear double-sided tape, silicone adhesive, cyanoacrylate, or combinations thereof.

Figure 3:
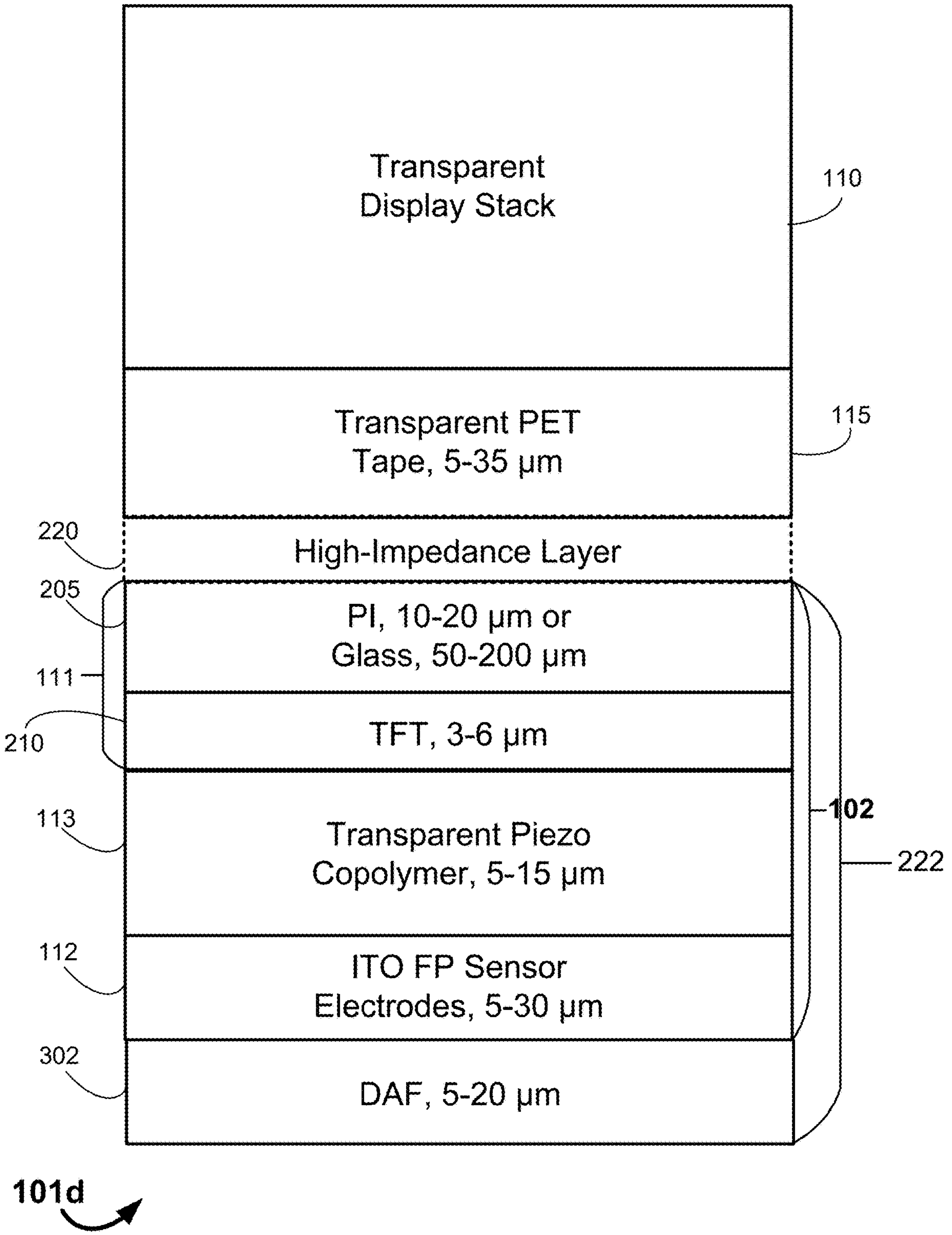
FIG. 3 shows additional examples of a transparent display stack and a transparent ultrasonic sensor stack.

In this example, the adhesive layer 115 forms one boundary of an acoustic resonator 222 that includes all layers of the transparent fingerprint sensor stack 102. This may sometimes be referred to herein as a "first boundary" of the acoustic resonator 222. In some examples, the transparent fingerprint sensor electrodes 112 may form a second boundary of the acoustic resonator 222. According to some examples, an interface between the transparent fingerprint sensor electrodes 112 and another layer, on a side opposing the side of the transparent fingerprint sensor electrodes 112 that is adjacent the transparent piezoelectric material(s) 113—may form a second boundary of the acoustic resonator 222. In some examples, e.g., as shown in FIG. 3, a passivation layer, such as a DAF layer, may reside on the transparent fingerprint sensor electrodes 112, on a side opposing the side of the transparent fingerprint sensor electrodes 112 that is adjacent the transparent piezoelectric material(s) 113. In some such examples, the passivation layer, or a material on an opposing side of the passivation layer from the transparent fingerprint sensor electrodes 112, may form the second boundary of the acoustic resonator 222. In some examples, an interface between the passivation layer and material on an opposing side of the passivation layer, relative to the transparent fingerprint sensor electrodes 112, may form the second boundary of the acoustic resonator 222. In some instances, the material on the opposing side of the passivation layer may be air. In some instances, the material on the opposing side of the passivation layer may be a high-impedance backing layer having a higher acoustic impedance than that of the passivation layer.

According to some examples, the acoustic resonator 222 may be configured to produce a local maximum of ultrasonic wave transmission at a frequency in the range from 1 MHz to 20 MHz. For example, the acoustic resonator 222 may have a thickness corresponding to a multiple M of a quarter wavelength corresponding to a frequency in the range from 1 MHz to 20 MHz, where M is an integer of 1 or more.

In some alternative examples, the transparent fingerprint sensor circuitry 111 may include a glass layer- or a layer of another material having a relatively higher acoustic impedance-instead of polyimide (PI) layer. The glass or other high-impedance layer may form one boundary of an acoustic resonator that includes the TFT layer 210, the transparent fingerprint sensor electrodes 112 and the transparent piezoelectric material(s) 113. In some examples, the acoustic resonator may be configured to produce a local maximum of ultrasonic wave transmission at a frequency in the range from 1 MHz to 20 MHz. For example, the acoustic resonator 222 may have a thickness corresponding to a multiple M of a quarter wavelength corresponding to a frequency in the range from 1 MHz to 20 MHz, where M is an integer or 1 or more.

According to this example, FIG. 2 shows an optional high-impedance layer 220 adjacent to the transparent adhesive layer(s) 115. The high-impedance layer 220 may, for example, be beneficial if acoustic impedance of the transparent adhesive layer(s) 115 is not substantially higher than that of the other layers of the transparent fingerprint sensor stack 102. The high-impedance layer 220 may, for example, have an acoustic impedance that is higher than an acoustic impedance of the transparent fingerprint sensor circuitry 111, higher than an acoustic impedance of the transparent fingerprint sensor electrodes 112, higher than an acoustic impedance of the transparent piezoelectric material(s) 113 and higher than an acoustic impedance of the adhesive layer 115. In some examples, the high-impedance layer 220 may have an acoustic impedance of 10 MRayls or more. The high-impedance layer 220 may, in some examples, form one boundary of an acoustic resonator that is configured to produce a local maximum of ultrasonic wave transmission at a frequency in the range from 1 MHz to 20 MHz.

FIG. 3 shows additional examples of a transparent display stack and a transparent ultrasonic sensor stack. As with other disclosed implementations, the types, number and arrangement of elements shown in FIG. 3 are merely examples. Other implementations may include different types, numbers and/or arrangements of elements. Here, the apparatus 101*d* is an instance of the apparatus 101*a* that is shown in FIG. 1A, an instance of the apparatus 101*b* that is shown in FIG. 1B and an instance of the apparatus 101*c* that is shown in FIG. 2.

In this example, the transparent fingerprint sensor stack 102 is attached to the transparent display stack 110 via one or more transparent adhesive layers 115, which are, or include, one or more layers of transparent polyethylene terephthalate (PET) tape in this instance. According to this example, the one or more PET tape layers have a thickness in the range of 5 microns to 35 microns. In some alternative examples, the one or more PET tape layers may have a thickness in the range of 2 microns to 50 microns. In this example, the apparatus 101*d* includes a die attach film (DAF) layer 302 having a thickness in the range of 5 microns to 20 microns. In some alternative examples, the DAF layer 302 may have a thickness in the range of 2 microns to 40 microns. The DAF layer 302 may, for example, be used to attach the transparent fingerprint sensor stack 102 to another portion of the apparatus 101*d* that is not shown in FIG. 3.

According to this example, the transparent fingerprint sensor stack 102 includes transparent fingerprint sensor circuitry 111, transparent fingerprint sensor electrodes 112 and a transparent piezoelectric layer 113. In this example, the transparent fingerprint sensor circuitry 111 includes a transparent substrate layer 205—which may be a flexible layer, such as a PI layer having a thickness in the range of 5 microns to 35 microns or a non-flexible layer such as a glass layer having a thickness in the range of 50 microns to 200 microns—and a TFT layer 210 having a thickness in the range of 3 microns to 6 microns. In some alternative examples, the transparent substrate layer 205 may be a may be a flexible layer, such as a PI layer, having a thickness in the range of 2 microns to 45 microns or a non-flexible layer such as a glass layer having a thickness in the range of 20 microns to 400 microns. In some examples, the TFT layer 210 may be an oxide TFT layer, such as an IGZO layer. In this example, the transparent fingerprint sensor electrodes 112 are, or include, ITO. Here, the ITO has a thickness in the range of 5 microns to 30 microns. In some alternative examples, the transparent fingerprint sensor electrodes 112 may have a thickness in the range of 2 microns to 50 microns. In this example, the transparent piezoelectric layer 113 is, or includes, one or more transparent piezoelectric copolymers having a thickness in the range of 5 microns to 15 microns. In some alternative examples, the transparent piezoelectric layer 113 may be, or may include, one or more transparent piezoelectric copolymers having a thickness in the range of 2 microns to 30 microns.

PET has an acoustic impedance in the range of 2.8-3.4 MRayls. In this example, the transparent adhesive layer 115 forms one boundary of an acoustic resonator 222 that includes the transparent fingerprint sensor circuitry 111, the transparent fingerprint sensor electrodes 112, the transparent piezoelectric layer 113 and the DAF layer 302. In some examples, the acoustic resonator 222 may be configured to produce a local maximum of ultrasonic wave transmission at a frequency in the range from 1 MHz to 20 MHz. For example, the acoustic resonator 222 may have a thickness corresponding to a multiple M of a quarter wavelength corresponding to a frequency in the range from 1 MHz to 20 MHz, where M is an integer or 1 or more.

According to this example, FIG. 3 shows an optional high-impedance layer 220 adjacent to the transparent adhesive layer(s) 115. The high-impedance layer 220 may, for example, be beneficial if acoustic impedance of the transparent adhesive layer(s) 115 is not substantially higher than that of the other layers of the transparent fingerprint sensor stack 102. The high-impedance layer 220 may, for example, have an acoustic impedance that is higher than an acoustic impedance of the transparent fingerprint sensor circuitry 111, higher than an acoustic impedance of the transparent fingerprint sensor electrodes 112, higher than an acoustic impedance of the transparent piezoelectric material(s) 113 and higher than an acoustic impedance of the adhesive layer 115. In some examples, the high-impedance layer 220 may have an acoustic impedance of 10 MRayls or more. The high-impedance layer 220 may, in some examples, form one boundary of an acoustic resonator that is configured to produce a local maximum of ultrasonic wave transmission at a frequency in the range from 1 MHz to 20 MHz.

Figure 4:
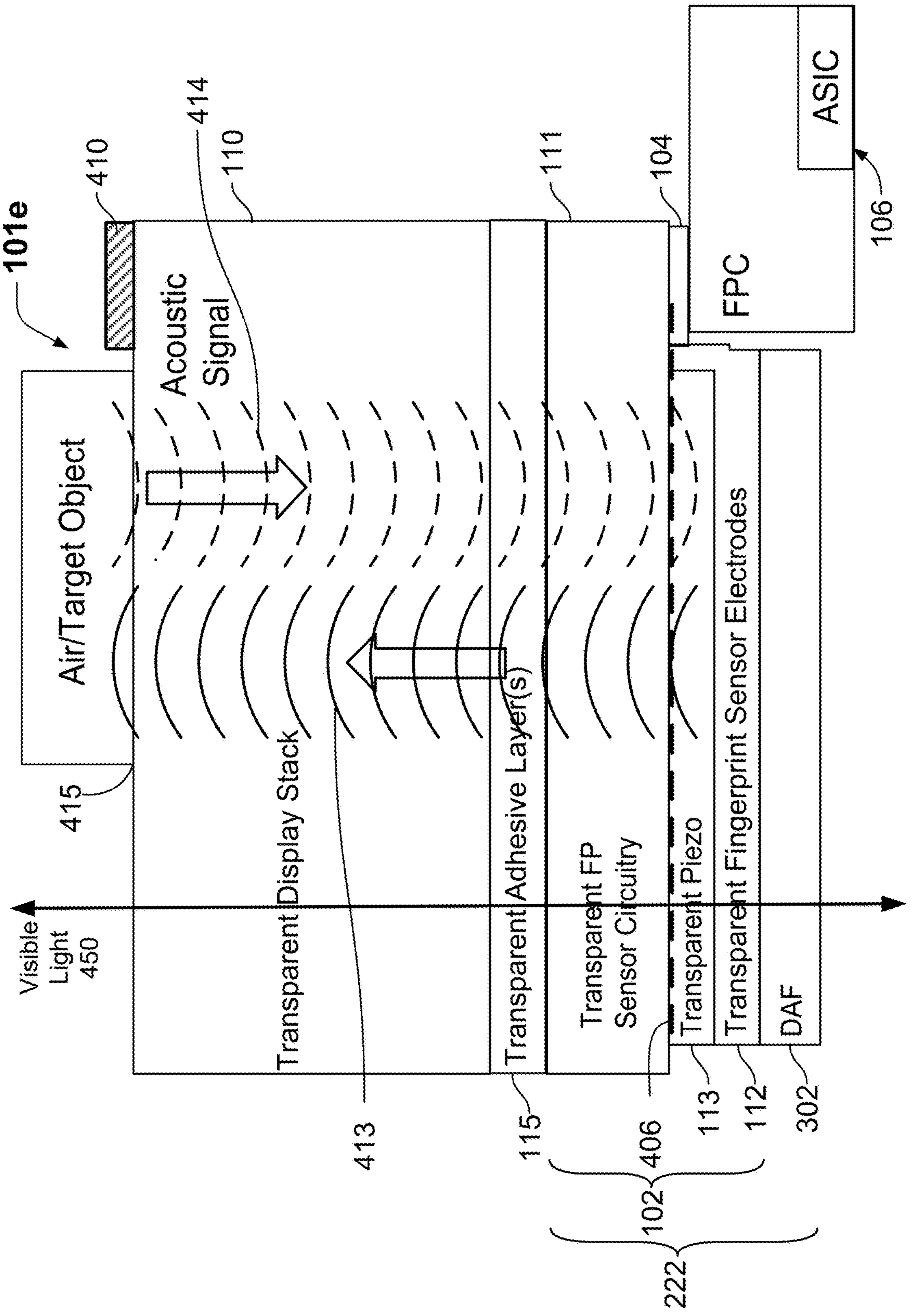
FIG. 4 shows examples of light and ultrasound traversing components of an apparatus according to some disclosed implementations.

FIG. 4 shows examples of light and ultrasound traversing components of an apparatus according to some disclosed implementations. As with other disclosed implementations, the types, number and arrangement of elements, as well as the dimensions of elements, are merely examples. According to this example, the apparatus 101*e* is configured to perform at least some of the methods disclosed herein. According to this implementation, the transparent fingerprint sensor stack 102 includes a transparent piezoelectric layer 113, transparent fingerprint sensor electrodes 112 on one side of the transparent piezoelectric layer 113 and an array of transparent sensor pixels 406—which are parts of the transparent fingerprint sensor circuitry 111—on a second and opposing side of the transparent piezoelectric layer 113. In this implementation, the transparent piezoelectric layer 113 includes one or more transparent piezoelectric polymers. In other implementations, the transparent piezoelectric layer 113 may include other types of transparent piezoelectric materials.

According to this example, the transparent fingerprint sensor electrodes 112 reside between a DAF layer 302 and the transparent piezoelectric layer 113. In this example, the DAF layer 302 is also transparent. Accordingly, visible light 450 can pass through all layers of the apparatus 101*e* except where the visible light 450 is blocked by the bezel 410.

In this example, the transparent adhesive layer 115 forms one boundary of an acoustic resonator 222 that includes the transparent fingerprint sensor circuitry 111, the transparent fingerprint sensor electrodes 112, the transparent piezoelectric layer 113 and the DAF layer 302. In some examples, the acoustic resonator 222 may be configured to produce a local maximum of ultrasonic wave transmission at a frequency in the range from 1 MHz to 20 MHz. For example, the acoustic resonator 222 may have a thickness corresponding to a multiple M of a quarter wavelength corresponding to a frequency in the range from 1 MHz to 20 MHz, where M is an integer of 1 or more.

According to this implementation, the transparent fingerprint sensor circuitry 111 and the transparent fingerprint sensor electrodes 112 are electrically coupled to at least a portion of the control system 106 via a portion of the interface system 104, which includes electrically conducting material and a flexible printed circuit (FPC) in this instance. In this implementation, a bezel 410 conceals a portion of the FPC that underlies part of the transparent display stack, the transparent adhesive layer 115 and the transparent fingerprint sensor circuitry 111.

In this example, the apparatus 101*e* is configured to perform at least some of the methods disclosed herein. In this example, the control system 106 is configured to control the ultrasonic sensor system to transmit one or more ultrasonic waves 413. According to this example, the ultrasonic waves 413 are transmitted through the transparent fingerprint sensor circuitry 111 and the transparent display stack 110. According to this example, reflections 414 of the ultrasonic waves 413 are caused by acoustic impedance contrast at (or near) the interface 415 between the outer surface of the apparatus 101*e* and whatever is in contact with the outer surface, which may be air or the surface of a target object, such as the ridges and valleys of a fingerprint, etc. (As used herein, the term “finger” may refer to any digit, including a thumb. Accordingly, a thumbprint will be considered a type of "fingerprint.")

According to some examples, reflections 414 of the ultrasonic wave(s) 413 may be detected by the array of sensor pixels 406. Corresponding fingerprint sensor signals may be provided to the control system 106. In some such implementations, fingerprint sensor signals that are used by the control system 106 for fingerprint-based authentication may be based on reflections 414 from a cover/finger interface that are detected by the array of sensor pixels 406. In some implementations, reflections 414 corresponding to a cover/air interface may be detected by the array of sensor pixels 406 and corresponding background fingerprint sensor signals may be provided to the control system 106.

Figure 5:
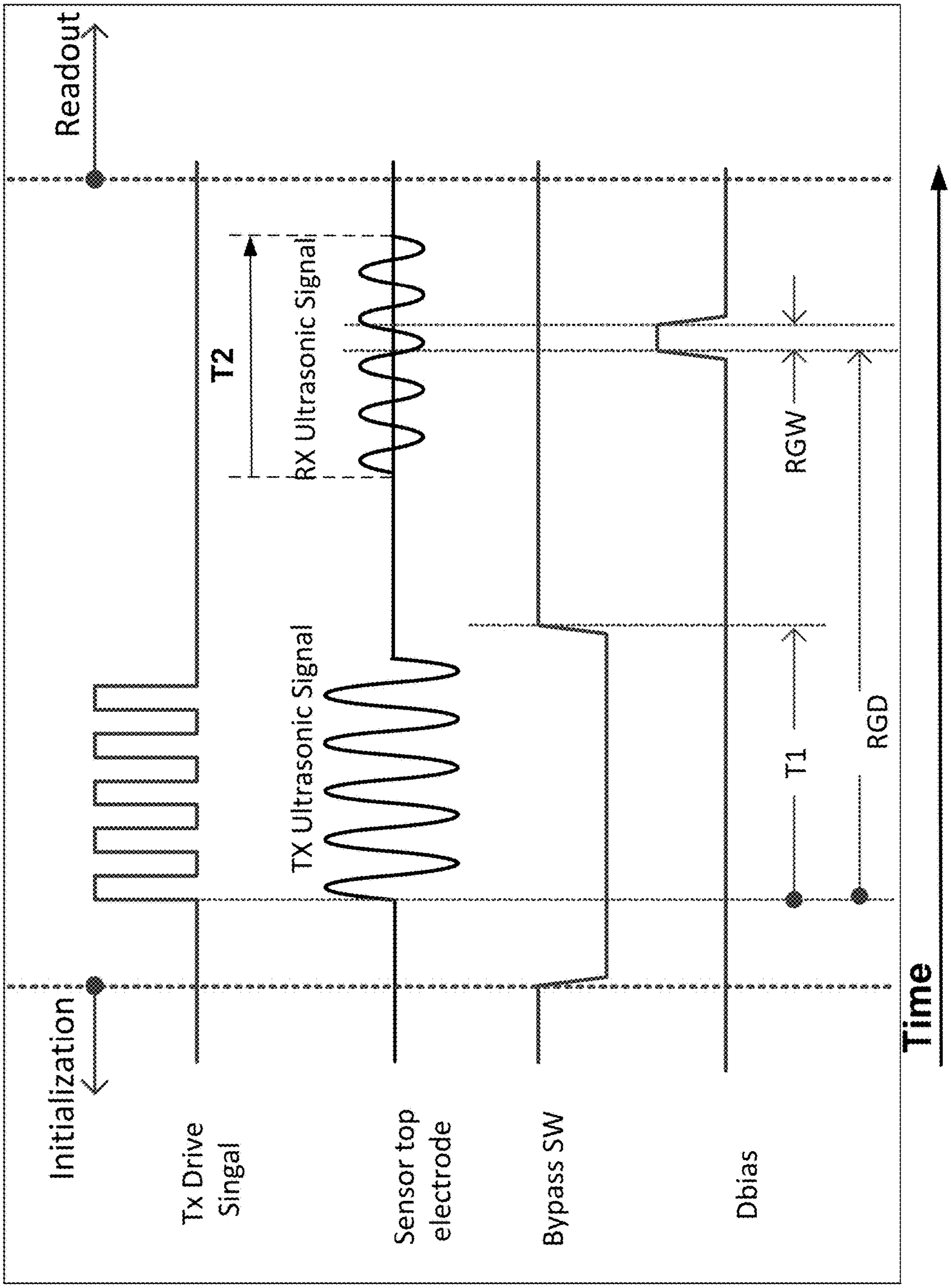
FIG. 5 shows examples of processes that may be involved with transmitting and receiving ultrasonic waves.

FIG. 5 shows examples of processes that may be involved with transmitting and receiving ultrasonic waves. The processes of FIG. 5 may, for example, be performed by the apparatus 101*a* of FIG. 1A—for example, at least in part by the control system 106 of FIG. 1A—by the apparatus 101*b* of FIG. 1B, by the apparatus 101*c* of FIG. 2, by the apparatus 101*d* of FIG. 3, by the apparatus 101*e* of FIG. 4, or by a similar device.

In the examples shown in FIG. 5, the transmission (TX) drive signals and corresponding ultrasonic transmission pulses are provided during time interval T1. Ultrasonic waves corresponding to reflections from a target object are received (RX) during a later time interval T2. Ultrasonic waves corresponding to reflections from the target object are sampled by an ultrasonic receiver during a time interval known as a range gate window (RGW), after a time interval known as a range gate delay (RGD). The RGD may, for example, be set according to a two-way travel time to and from a target of interest. In an ultrasonic fingerprint sensor context, one such target of interest may be the ridges and valleys of the epidermis of a finger that has been placed on an outer surface of an apparatus that includes the ultrasonic fingerprint sensor. Other such targets of interest may include sub-epidermal structures of a finger, a wrist, or other body part.

As with other disclosed examples, the types, numbers and arrangements of elements that are shown in FIG. 5 are merely presented by way of example. Other examples may include different types of elements, numbers of elements, arrangements of elements, or combinations thereof. For example, other implementations may involve transmitting more or fewer ultrasonic transmission pulses, may involve a shorter or longer RGD, a shorter or longer RGW, or combinations thereof. Some alternative examples may involve transmitting light instead of ultrasound. The transmitted light may induce one or more tissues, blood, etc., to emit ultrasonic waves that can be detected by an ultrasonic receiver array.

As noted elsewhere herein, data received from fingerprint sensor implementations of the transparent fingerprint sensor stack 102 may sometimes be referred to herein as "fingerprint sensor data," "fingerprint sensor signals," "fingerprint image data," etc., whether or not the received data corresponds to an actual digit or another object from which the transparent fingerprint sensor stack 102 has received data. Such data will generally be received from the fingerprint sensor system in the form of electrical signals. Accordingly, without additional processing such image data would not necessarily be perceivable by a human being as an image.

Figure 6:
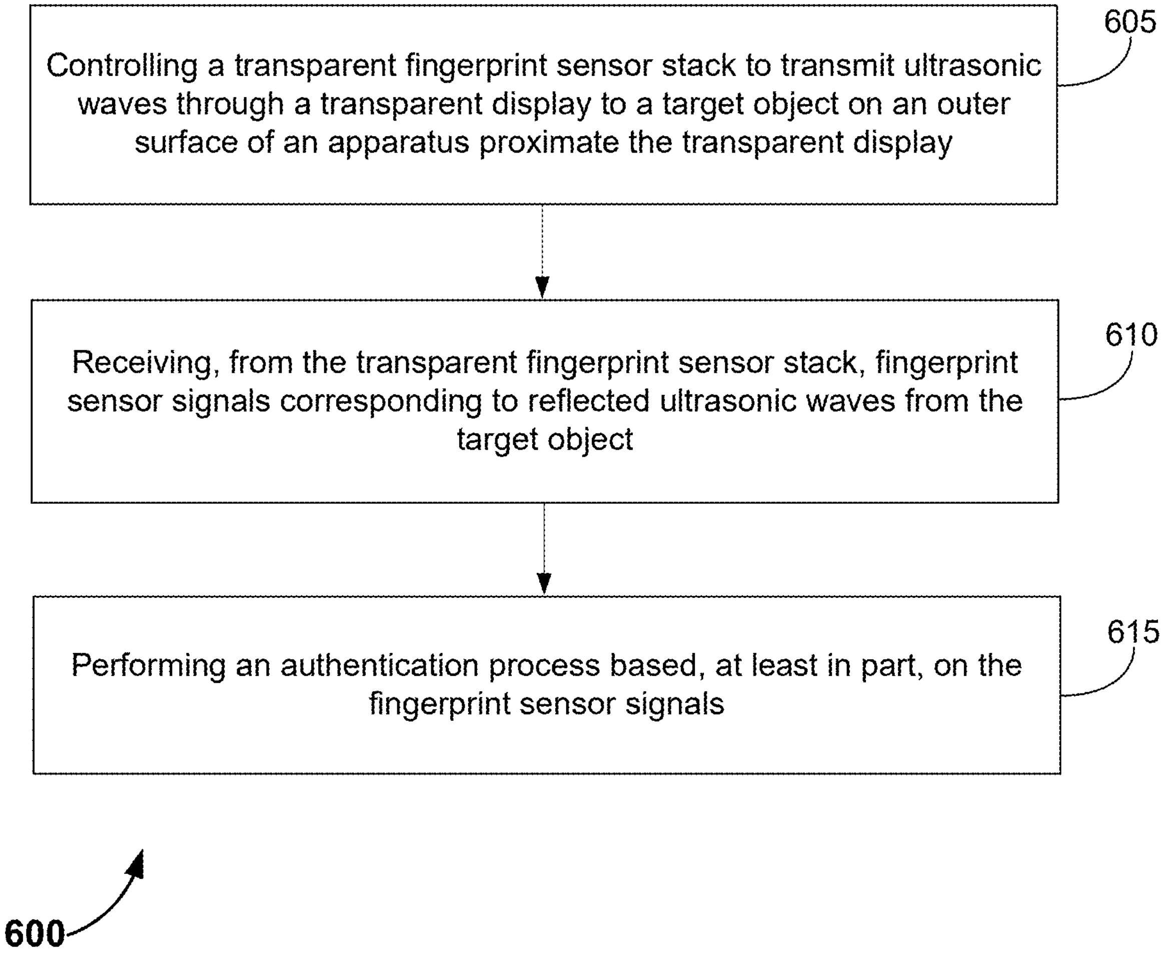
FIG. 6 is a flow diagram that presents examples of operations according to some disclosed methods.

FIG. 6 is a flow diagram that presents examples of operations according to some disclosed methods. The blocks of FIG. 6 may, for example, be performed by the apparatus 101*a* of FIG. 1A—for example, at least in part by the control system 106 of FIG. 1A—by the apparatus 101*b* of FIG. 1B, by the apparatus 101*c* of FIG. 2, by the apparatus 101*d* of FIG. 3, by the apparatus 101*e* of FIG. 4, or by a similar device. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 6 may include more or fewer blocks than indicated. Moreover, the blocks of methods disclosed herein are not necessarily performed in the order indicated. In some implementations, one or more blocks may be performed concurrently.

According to this example, method 600 is a method of controlling a device that includes a transparent fingerprint sensor stack. In this example, block 605 involves controlling a transparent fingerprint sensor stack to transmit ultrasonic waves through a transparent display to a target object on an outer surface of an apparatus proximate the transparent display. In some examples, one or more layers of the transparent fingerprint sensor stack may be at least a part of an acoustic resonator configured to produce a local maximum of ultrasonic wave transmission at a frequency in a range from 1 MHz to 20 MHz. According to this example, block 610 involves receiving, from the transparent fingerprint sensor stack, fingerprint sensor signals corresponding to reflected ultrasonic waves from the target object. In this example, block 615 involves performing an authentication process based, at least in part, on the fingerprint sensor signals. According to some examples, the authentication process involves extracting fingerprint minutiae from the fingerprint sensor signals and comparing the fingerprint minutiae to previously-obtained fingerprint minutiae. The previously-obtained fingerprint minutiae may, for example, have been obtained during a previous enrollment process.

Implementation examples are described in the following numbered clauses:

1. An apparatus, including a transparent display stack; and a transparent fingerprint sensor stack, the transparent fingerprint sensor stack including: transparent fingerprint sensor circuitry; transparent fingerprint sensor electrodes; a transparent piezoelectric layer; and a transparent adhesive layer proximate the transparent display stack, where at least some layers of the transparent fingerprint sensor stack are included in an acoustic resonator configured to produce a local maximum of ultrasonic wave transmission at a frequency in a range from 1 MHz to 20 MHz.
2. The apparatus of clause 1, where the apparatus is a transparent apparatus configured to allow visible light to pass from outside of a first side of the apparatus proximate the transparent display stack, through the transparent display stack and the transparent fingerprint sensor stack, to outside of a second side of the apparatus proximate the transparent fingerprint sensor stack.
3. The apparatus of clause 1 or clause 2, further including an ultraviolet light blocking layer configured to block most or all ultraviolet light from reaching at least a portion of the transparent fingerprint sensor circuitry.
4. The apparatus of any one of clauses 1-3, where the transparent adhesive layer is one boundary of the acoustic resonator.
5. The apparatus of any one of clauses 1-4, where: the transparent fingerprint sensor stack also includes a high-impedance layer adjacent to the transparent adhesive layer; the high-impedance layer is one boundary of the acoustic resonator; and the high-impedance layer has a high-impedance layer acoustic impedance that is higher than a transparent fingerprint sensor circuitry acoustic impedance, higher than a transparent fingerprint sensor electrode acoustic impedance and higher than a transparent piezoelectric layer acoustic impedance.

6. The apparatus of any one of clauses 1-5, where the transparent display stack includes a transparent light-emitting diode (LED) stack and where the transparent LED stack is, or includes, a transparent microLED stack or a transparent organic LED (OLED) stack.
7. The apparatus of any one of clauses 1-6, where the transparent fingerprint sensor circuitry is, or includes, a glass-based or polyimide-based thin-film transistor (TFT) layer.
8. The apparatus of any one of clauses 1-7, where the transparent fingerprint sensor electrodes are, or include, indium tin oxide (ITO), graphene-based electrodes, silver nanowires, carbon nanotubes, one or more conductive polymers, aluminum-doped zinc oxide (AZO), fluorine-doped tin oxide (FTO), or combinations thereof.
9. The apparatus of any one of clauses 1-8, where the transparent piezoelectric layer is, or includes, one or more piezoelectric copolymers, PVDF, lead magnesium niobate/lead titanate (PMN-PT), lithium niobate ($LiNbO_3$), or combinations thereof.
10. The apparatus of any one of clauses 1-9, where the transparent adhesive layer is, or includes, ultraviolet (UV) adhesive, a clear epoxy resin, clear double-side tape, silicone adhesive, cyanoacrylate, or combinations thereof.
11. The apparatus of any one of clauses 1-10, where the apparatus is, or includes, augmented reality (AR) glasses, an AR or a virtual reality (VR) headset, a motorcycle visor, a television or other display device, a laptop computer, or a windscreen or other vehicle component.
12. The apparatus of any one of clauses 1-11, further including a control system including one or more processors, where the control system is configured to: control the transparent fingerprint sensor stack to transmit ultrasonic waves to a target object on an outer surface of the apparatus; receive, from the transparent fingerprint sensor stack, fingerprint sensor signals corresponding to reflected ultrasonic waves from the target object; and perform an authentication process based, at least in part, on the fingerprint sensor signals.
13. The apparatus of clause 12, where the transparent display stack resides between the transparent fingerprint sensor stack and the outer surface of the apparatus on which the target object is.
14. The apparatus of clause 12, where the transparent fingerprint sensor stack resides between the transparent display stack and the outer surface of the apparatus on which the target object is.
15. An apparatus, including: transparent display means; and a transparent fingerprint sensor stack, including: transparent fingerprint sensor circuitry; transparent fingerprint sensor electrodes; a transparent piezoelectric layer; and a transparent adhesive layer proximate the transparent display stack, where at least some layers of the transparent fingerprint sensor stack are parts of an acoustic resonator configured to produce a local maximum of ultrasonic wave transmission at a frequency in a range from 1 MHz to 20 MHz.
16. The apparatus of clause 15, where the apparatus is a transparent apparatus configured to allow visible light to pass from outside of a first side of the apparatus proximate the transparent display means, through the transparent display stack and the transparent fingerprint sensor stack, to outside of a second side of the apparatus proximate the transparent fingerprint sensor stack.
17. The apparatus of clause 15 or clause 16, further including an ultraviolet light blocking layer configured to block most or all ultraviolet light from reaching at least a portion of the transparent fingerprint sensor circuitry.
18. The apparatus of any one of clauses 15-17, further including control means for: controlling the transparent fingerprint sensor stack to transmit ultrasonic waves to a target object on an outer surface of the apparatus; receiving, from the transparent fingerprint sensor stack, fingerprint sensor signals corresponding to reflected ultrasonic waves from the target object; and performing an authentication process based, at least in part, on the fingerprint sensor signals.
19. A method, including; controlling a transparent fingerprint sensor stack to transmit ultrasonic waves through a transparent display to a target object on an outer surface of an apparatus proximate the transparent display; receiving, from the transparent fingerprint sensor stack, fingerprint sensor signals corresponding to reflected ultrasonic waves from the target object; and performing an authentication process based, at least in part, on the fingerprint sensor signals.
20. The method of clause 19, where at least some layers of the transparent fingerprint sensor stack are parts of an acoustic resonator configured to produce a local maximum of ultrasonic wave transmission at a frequency in a range from 1 MHz to 20 MHz.
21. The method of clause 19 or clause 20, where the authentication process involves extracting fingerprint minutiae from the fingerprint sensor signals and comparing the fingerprint minutiae to previously-obtained fingerprint minutiae.

As used herein, a phrase referring to “at least one of” a list of items refers to any combination of those items, including single members. As an example, “at least one of: a, b, or c” is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:

a transparent display stack; and a transparent fingerprint sensor stack, comprising:

transparent fingerprint sensor circuitry;

transparent fingerprint sensor electrodes;

a transparent piezoelectric layer; and an ultraviolet light blocking layer configured to block most or all ultraviolet light from reaching at least a portion of the transparent fingerprint sensor circuitry; and a transparent adhesive layer proximate the transparent display stack, wherein two or more layers of the transparent fingerprint sensor stack comprise an acoustic resonator configured to produce a local maximum of ultrasonic wave transmission at a frequency in a range from 1 MHz to 20 MHz.

2. The apparatus of claim 1, wherein the apparatus is a transparent apparatus configured to allow visible light to pass from outside of a first side of the apparatus proximate the transparent display stack, through the transparent display stack and the transparent fingerprint sensor stack, to outside of a second side of the apparatus proximate the transparent fingerprint sensor stack.

3. The apparatus of claim 1, wherein the transparent adhesive layer comprises one boundary of the acoustic resonator.

4. The apparatus of claim 1, wherein:

the transparent fingerprint sensor stack also includes a high-impedance layer adjacent to the transparent adhesive layer;

the high-impedance layer comprises one boundary of the acoustic resonator; and the high-impedance layer has a high-impedance layer acoustic impedance that is higher than a transparent fingerprint sensor circuitry acoustic impedance, higher than a transparent fingerprint sensor electrode acoustic impedance and higher than a transparent piezoelectric layer acoustic impedance.

5. The apparatus of claim 1, wherein the transparent display stack comprises a transparent light-emitting diode (LED) stack and wherein the transparent LED stack comprises a transparent microLED stack or a transparent organic LED (OLED) stack.

6. The apparatus of claim 1, wherein the transparent fingerprint sensor circuitry comprises a glass-based or polyimide-based thin-film transistor (TFT) layer.

7. The apparatus of claim 1, wherein the transparent fingerprint sensor electrodes comprise indium tin oxide (ITO), graphene-based electrodes, silver nanowires, carbon nanotubes, one or more conductive polymers, aluminum-doped zinc oxide (AZO), fluorine-doped tin oxide (FTO), or combinations thereof.

8. The apparatus of claim 1, wherein the transparent piezoelectric layer comprises one or more piezoelectric copolymers, PVDF, lead magnesium niobate/lead titanate (PMN-PT), lithium niobate ($LiNbO_3$), or combinations thereof.

9. The apparatus of claim 1, wherein the transparent adhesive layer comprises ultraviolet (UV) adhesive, a clear epoxy resin, clear double-side tape, silicone adhesive, cyanoacrylate, or combinations thereof.

10. The apparatus of claim 1, wherein the apparatus comprises augmented reality (AR) glasses, an AR or a virtual reality (VR) headset, a motorcycle visor, a television or other display device, a laptop computer, or a windscreen or other vehicle component.

11. The apparatus of claim 1, further comprising a control system including one or more processors, wherein the control system is configured to:

control the transparent fingerprint sensor stack to transmit ultrasonic waves to a target object on an outer surface of the apparatus;

receive, from the transparent fingerprint sensor stack, fingerprint sensor signals corresponding to reflected ultrasonic waves from the target object; and perform an authentication process based, at least in part, on the fingerprint sensor signals.

12. The apparatus of claim 11, wherein the transparent display stack resides between the transparent fingerprint sensor stack and the outer surface of the apparatus on which the target object is.

13. The apparatus of claim 11, wherein the transparent fingerprint sensor stack resides between the transparent display stack and the outer surface of the apparatus on which the target object is.

14. An apparatus, comprising:

transparent display means; and a transparent fingerprint sensor stack, comprising:

transparent fingerprint sensor circuitry;

transparent fingerprint sensor electrodes;

a transparent piezoelectric layer; and an ultraviolet light blocking layer configured to block most or all ultraviolet light from reaching at least a portion of the transparent fingerprint sensor circuitry; and a transparent adhesive layer proximate the transparent display means, wherein two or more layers of the transparent fingerprint sensor stack comprise an acoustic resonator configured to produce a local maximum of ultrasonic wave transmission at a frequency in a range from 1 MHz to 20 MHz.

15. The apparatus of claim 14, wherein the apparatus is a transparent apparatus configured to allow visible light to pass from outside of a first side of the apparatus proximate the transparent display means, through the transparent display means and the transparent fingerprint sensor stack, to outside of a second side of the apparatus proximate the transparent fingerprint sensor stack.

16. The apparatus of claim 14, further comprising control means for:

controlling the transparent fingerprint sensor stack to transmit ultrasonic waves to a target object on an outer surface of the apparatus;

receiving, from the transparent fingerprint sensor stack, fingerprint sensor signals corresponding to reflected ultrasonic waves from the target object; and performing an authentication process based, at least in part, on the fingerprint sensor signals.

17. A method, comprising:

controlling a transparent fingerprint sensor stack to transmit ultrasonic waves through a transparent display to a target object on an outer surface of an apparatus proximate the transparent display, wherein the transparent fingerprint sensor stack comprises transparent fingerprint sensor circuitry and an ultraviolet light blocking layer configured to block most or all ultraviolet light from reaching at least a portion of the transparent fingerprint sensor circuitry, and wherein two or more layers of the transparent fingerprint sensor stack comprise an acoustic resonator configured to produce a local maximum of ultrasonic wave transmission at a frequency in a range from 1 MHz to 20 MHz;

receiving, from the transparent fingerprint sensor stack, fingerprint sensor signals corresponding to reflected ultrasonic waves from the target object; and performing an authentication process based, at least in part, on the fingerprint sensor signals.

18. The method of claim 17, wherein the two or more layers of the transparent fingerprint sensor stack comprise two or more of a transparent fingerprint sensor circuitry layer, a transparent fingerprint sensor electrode layer or a transparent piezoelectric layer.

19. The method of claim 17, wherein the authentication process involves extracting fingerprint minutiae from the fingerprint sensor signals and comparing the fingerprint minutiae to previously-obtained fingerprint minutiae.

* * * * *